Feb. 27, 1923. 1,446,713
M. MACEIJ
POTATO CUTTER ATTACHMENT FOR POTATO PLANTERS
Filed Nov. 23, 1922
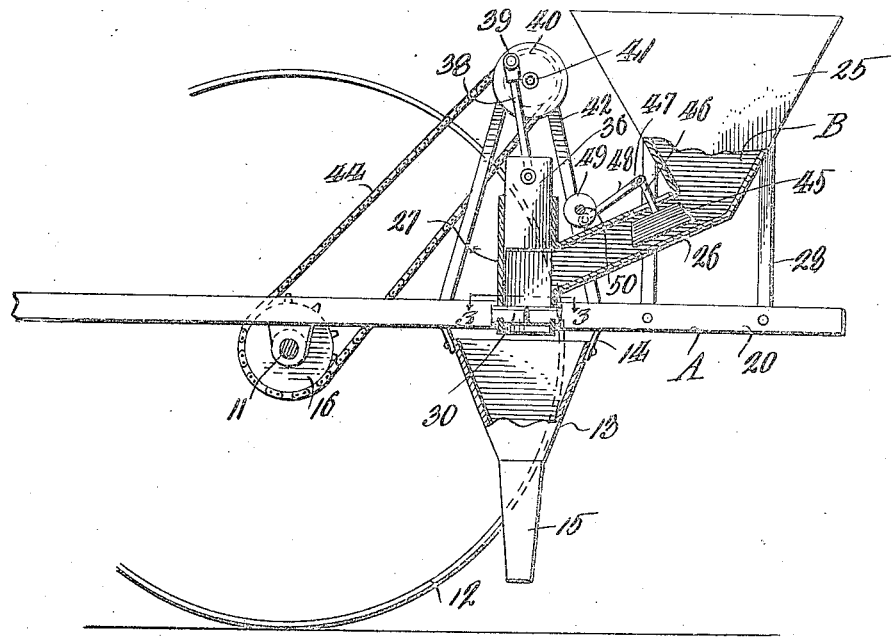
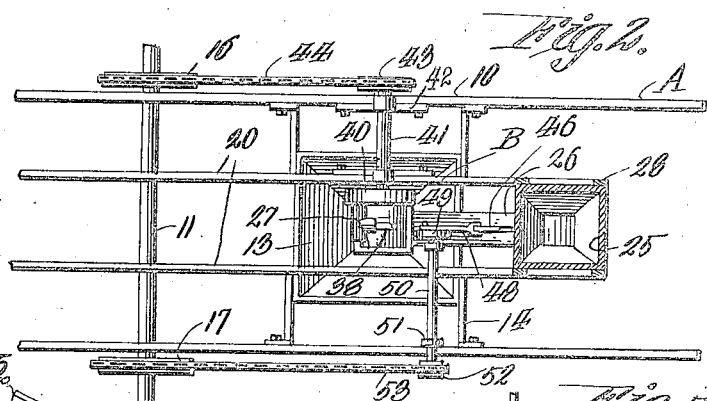
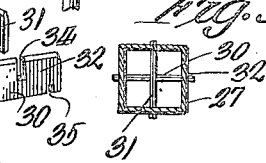
Inventor
MIKE MACEIJ Patented Feb. 27, 1923.

1,446,713

UNITED STATES PATENT OFFICE.

MIKE MACIEJ, OF BOWLUS, MINNESOTA.

POTATO-CUTTER ATTACHMENT FOR POTATO PLANTERS.

Application filed November 23, 1922. Serial No. 602,835.

*To all whom it may concern:*

Be it known that I, MIKE MACIEJ, a citizen of the United States, residing at Bowlus, in the county of Morrison and State of Minnesota, have invented certain new and useful Improvements in a Potato-Cutter Attachment for Potato Planters, of which the following is a specification.

This invention relates to atteahments for potato planters and the primary object of the invention is to provide an improved seed potato cutting attachment which can be quickly and expeditiously connected with potato planters now on the market.

Another object of the invention is to provide novel means for permitting whole seed potatoes to be fed to the machine and cut into sections prior to the planting thereof into the ground.

A further object of the invention is to provide novel means working in unison with the potato cutting device for insuring the correct feeding of the potatoes to the seed cutter, said means being mounted for swinging movement to agitate the potatoes and thus insure the feeding of the potatoes to the cutter.

A further object of the invention is to provide a potato seed cutter for potato planters embodying a housing disposed directly above the planter funnel and connected with the hopper for receiving the whole potatoes having a stationary cutting knife disposed in the lower end thereof and provided with a reciprocating plunger for forcing the potatoes against the knives and into the planter funnel.

A further object of the invention is to provide novel means for connecting the reciprocating plunger with the drive axle of the planter, so that the seed cutter will be automatically operated during the movement of the planter over a field.

A still further object of the invention is to provide an improved potato seed cutter for potato planters of the above character, which is durable and efficient in use, one that is simple and easy to manufacture and one which can be placed upon the market at a reasonable cost.

With these and other objects in view the invention consists in the novel construction, arrangement and formation of parts, as will be hereinafter more specifically described, claimed, and illustrated in the accompanying drawings, forming a part of this specification, in which drawings:

Figure 1 is a fragmentary longitudinal section through a potato planting machine showing the improved attachment applied thereto, parts of the attachment being shown in longitudinal section.

Figure 2 is a fragmentary plan view of a potato planter showing the improved seed cutter connected therewith.

Figure 3 is a detail horizontal section through the improved attachment taken on the line 3—3 of Figure 1 illustrating the stationary cutting knives.

Figure 4 is a detail vertical section through the plunger for forcing the potatoes into engagement with the knife and into the planting funnel.

Figure 5 is a detailed perspective view of the companion portions of the potato cutting knife.

Referring to the drawings in detail, wherein similar reference characters designate corresponding parts throughout the several views, the letter A generally indicates a potato planter and B an improved potato seed cutter therefor.

The planter A is of the conventional type and has merely been shown to illustrate the use of the improved invention. As shown the same includes the longitudinally extending side bars or beams 10, the supporting axle 11, on which is mounted the ground wheels 12. A depending hopper 13 is connected intermediate the side bars or beams 10 by means of transverse brace bars 14 as clearly shown in Figures 1 and 2 of the drawings. The hopper 13 is provided with a depending planter spout 15, which is of the ordinary construction.

As shown the axle 11 is provided with a pair of spaced sprocket wheels 16 and 17, the purpose of which, will be hereinafter more fully described. Disposed between the longitudinally extending side bars or beams 10 are a pair of supplemental beams 20 which form a part of the present invention and which support the various parts of the device, which will now be described.

The improved attachment includes a vertically disposed hopper 25 in which the whole potatoes are placed and this hopper is provided with an inclined forwardly extending outlet tube 26 through which the potatoes are adapted to fall. The forward end of the tube 26 supports a vertically disposed housing or casing 27 which is disposed directly above the hopper 13. The potato receiving hopper 25 is secured to suitable standards 28 which are in turn riveted or connected in any other preferred manner to the intermediate beams or bars 20. The lower end of the housing or casing 27 supports the stationary knife 30 of the potato seed cutter and this stationary knife 30 includes a pair of companion sections 31 and 32 which are adapted to extend at right angles to one another. The lower edge of the section 31 is provided with a notch 33 at its central portion while the upper edge of the section 32 is provided with a notch 34 at its central portion and it can be seen that these notches are adapted to inter-fit as can be seen by referring to Figure 1 of the drawings. The lower edges of each of the sections 31 and 32 are provided with notches 35 for fitting in the wall of the casing or housing 27.

A plunger preferably formed of wood or the like 36 is slidably mounted within the housing or casing and is adapted to force the potatoes as they fall into the housing of casing 27 into engagement with the knives 30 and thus cut the potatoes into four sections, prior to their entrance into the hopper 13. The upper end of the plunger 36 supports a wrist pin 37 on which is mounted a pitman rod 38. This pitman rod 38 has its upper end connected to a suitable crank pin 39 carried by a crank wheel 40. This crank wheel 40 is keyed or otherwise secured to a short transversely extending shaft 41. This shaft 41 is supported by suitable bearing brackets 42 which are connected to one of the side beams 10 and to one of the intermediate beams 20. A sprocket wheel 43 is keyed or otherwise secured to the outer end of the shaft 41 and a sprocket chain 44 is trained about the sprocket wheel 43 and about the sprocket wheel 16 and thus it can be seen that the plunger is driven directly by the drive axle 11.

In order to insure the correct feeding of the potatoes from the hopper 25 to the housing or casing 27 a suitable agitating blade 45 is mounted within the outlet tube 26 and has its upper end secured to a pivoted lever 46. This lever 46 has its upper end extended through a slot in one wall of the outlet tube 26 and is pivotally connected as at 47 to a connecting rod 48 which is eccentrically connected to crank wheel 49. This crank wheel 49 is keyed or otherwise secured to a relatively short shaft 50 which is mounted in suitable bearings carried by bearing brackets 51. A sprocket wheel 52 is keyed to the shaft 50 and a sprocket chain 53 is trained about the sprocket wheel 52 and the sprocket wheel 17 which is keyed to the drive axle 11. It thus can be seen that this agitating blade is moved back and forth within the outlet tube to insure the correct feeding of potatoes to the cutting mechanism.

It is preferred that the various parts of the attachment be connected to the potato planter frame by means of bolts so that the same may be readily disconnected therefrom when so desired. It is obvious that this attachment can be conveniently connected with the planter frame in a minimum amount of time and effort.

From the foregoing description it can be seen that an improved potato seed cutter has been provided for potato planting machines in which the whole potatoes can be fed into a hopper carried by the machine and the potatoes cut into sections prior to the delivering of the same to the planter spout. This of course obviates the necessity of cutting the seed potatoes prior to the placing of the same within the hopper.

Changes in details may be made without departing from the spirit or scope of the invention.

What I claim as new is:—

1. The combination with a potato planter including a frame and a delivery spout, of an attachment for the planter comprising a hopper arranged to receive the potatoes, means for securing the hopper to the frame, a housing disposed in a vertical plane, a tube connecting the lower end of the hopper with the housing at a point intermediate its ends, a stationary cutting knife disposed in the housing below said delivery tube, a sliding plunger carried by the housing and arranged to force the potatoes into engagement with the knife, and means for operating said plunger.

2. The combination with a potato planter including a frame, a delivery spout and a drive axle, of an attachment therefor including a relatively large hopper for receiving whole potatoes, a vertically disposed housing carried by the frame and arranged directly above the delivery spout, a delivery tube connecting the lower ends of the hopper with the housing at a point intermediate its ends, cross stationary cutting blades disposed in the housing below said delivery tube, a plunger snugly fitting said housing and slidably mounted therein, a driven shaft, means connecting the driven shaft with the frame, means operatively connecting the driven shaft with the plunger, and means operatively connecting the driven shaft with the drive axle of the planter.

3. The combination with a potato planter including a frame, a delivery spout and a drive axle, of an attachment for the planter including a relatively large hopper for receiving whole potatoes, beams securing the hopper to the frame, a housing disposed directly above the delivery spout, means connecting the housing to the frame, a stationary knife carried by the lower end of the housing, a delivery tube connecting the hopper with the housing, a reciprocating plunger mounted in the housing, and an agitator disposed in said tube.

4. The combination with a potato planter including a frame, a drive axle and a delivery spout, of an attachment therefor including a relatively large hopper for receiving whole potatoes, a housing disposed directly above the delivery spout, an inclined delivery tube connected with the lower end of the hopper and the housing at a point intermediate its ends, a stationary knife carried by the lower end of the housing, a reciprocating plunger, means connecting the reciprocating plunger with the drive axle, an agitator mounted in said tube adjacent to the hopper including a swinging blade, a driven shaft, a crank wheel secured to the driven shaft, means connecting the crank wheel with the swinging blade, and means connecting the driven shaft with the drive axle.

In testimony whereof I affix my signature in presence of two witnesses:

MIKE MACIEJ.

Witnesses:
ALB. A. BARTON,
W. G. LUNDQUIST.